Feb. 14, 1939.   H. HUBBELL, JR   2,146,741
MOUNTING FOR ELECTRICAL DEVICES
Filed July 14, 1937

INVENTOR
Harvey Hubbell Jr.
BY
Wooster & Davis
ATTORNEYS.

Patented Feb. 14, 1939

2,146,741

UNITED STATES PATENT OFFICE 2,146,741

MOUNTING FOR ELECTRICAL DEVICES

Harvey Hubbell, Jr., Bridgeport, Conn.

Application July 14, 1937, Serial No. 153,464

1 Claim. (Cl. 247—20)

This invention relates to new and useful improvements in electrical house wiring, and has particular relation to the mounting of electrical devices such as switches, wall receptacles, etc., in wall outlet boxes.

In wiring houses the outlet boxes are not infrequently set crooked, or not at the proper level or relation to the surface of the wall, in the haste to install them, and then when a switch, outlet receptacle, or other device is mounted in the box it also will be crooked and will not be straight and flush with the surface of the wall in which it is mounted.

To overcome these objections mounting yokes or mounting lugs or means for such devices have been provided having extensions to lie against the surface of the wall, in which the device is being mounted, to locate it flush with the wall surface. However, if the arrangement is such that for any reason these extensions cannot be used for this purpose, as for example when the wall surface in the vicinity of the outlet box is broken away or does not come sufficiently near the box so such extensions may not project sufficiently to rest on said surface a plurality of washers are employed for boosting the electrical device outwardly at either or both ends to bring it flush with the surface of the wall in which it is being mounted. These washers are also used when the wall box is not mounted straight or in the proper location to level and straighten up the wiring device to locate it parallel with the wall surface and in the proper relation thereto.

An object of the present invention is to provide a mounting means for electrical devices which includes all the elements necessary for the mounting of an electrical device in a wall box under any of the conditions above mentioned whereby to bring such device flush with the surface of the wall in which it is mounted, or to locate the device parallel with and in proper relation to said surface.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
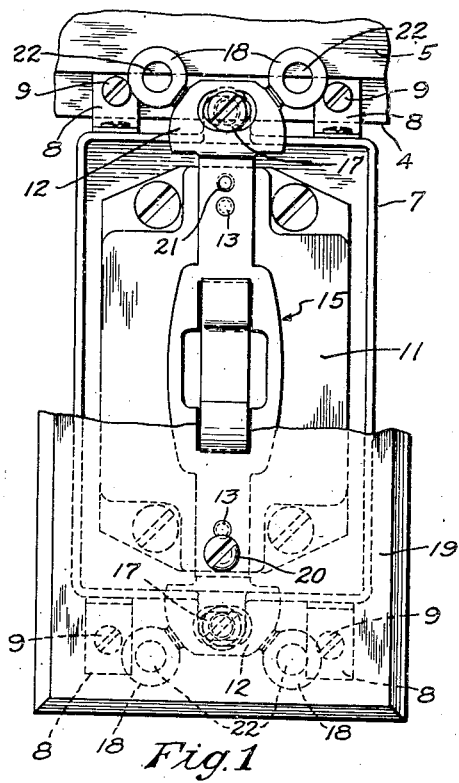
Fig. 1 is a front elevational view showing a wall switch mounted in an outlet box by the means of the invention, a portion of the cover or wall plate being broken partly away.

Referred in detail to the drawing a portion of a wall is shown including studding or lathing 4 and plaster 5, and is provided with an opening 6 receiving an outlet box 7 mounted as by ears 8 having screws or the like 9 passing therethrough into a portion of the lathing or studding 4 of the wall. The outlet box also includes ear-like extensions 10 having a screw threaded opening to receive screws for the purpose of securing a switch, receptacle or similar wiring device in the box as will appear.

In the drawing a switch 11 is shown mounted in the outlet box 7, although it is to be understood that the invention is not limited to the mounting of switches and that the switch 11 is shown only for the purpose of illustration since the same might be any other wiring device as an outlet receptacle or the like. Switch 11 has lugs 12 secured to the front face of the body thereof as by means of screws 13 passing through such body. Said lugs 12 project beyond the ends of the switch body and each is provided with an opening 14 for passage of a screw 17 for use in mounting the switch or other wiring device in the box 7.

Here the lugs 12 are integral parts of a yoke generally designated 15 and including a bridging piece 16 which extends longitudinally across the face of the switch body. By means of the screws 17 passing through the openings 14 and threaded into the threaded openings or perforations in the ears 10 the yoke 15 is secured to the outlet box supporting the switch 11 therein.

Figure 2:
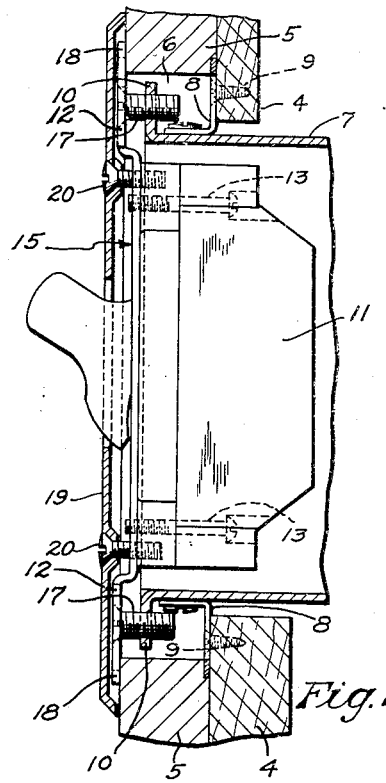
Fig. 2 is a side elevational view thereof, the wall outlet box, wall plate and the wall adjacent the outlet box being shown in section.
Figure 3:
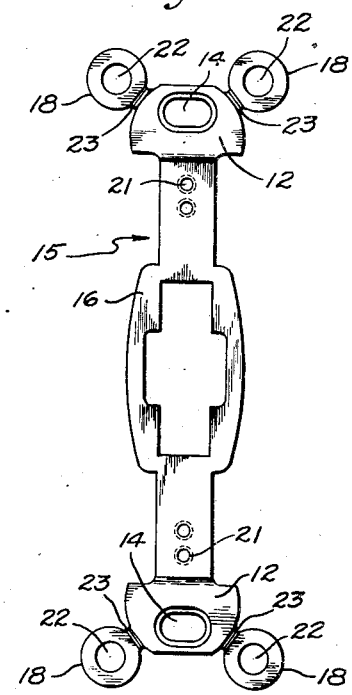
Fig. 3 is a front elevational view of the improved mounting means or device.

When the opening 6 is properly cut in the wall 5 the edges of the opening come close to the ears 10 on the box 7. On each of the lugs 12 are a pair of spaced ear-like extensions 18 projecting longitudinally and laterally beyond the lugs 12 to overlie the front surface of the wall 5 as shown best in Fig. 2. These extensions lying against the face of the wall adjacent the box 7 insure the proper positioning of the switch or other wiring device in the box. In Fig. 2 it is noted that the cover or wall plate 19 is attached to the lugs 12 by means of screws 20 passing through the plate and into threaded openings 21 in the lugs. This plate is hollow on its rear side and so receives the extensions 18 and the latter while insuring the proper mounting of the switch do not interfere with the mounting of the plate 19.

The extensions 18 are each centrally perforated or provided with an opening at 22 whereby the extensions are in the form of rings or washers, and the line of connection of each extension with the lugs 12 is weakened by being scored or partly severed as at 23. Therefore it will be clear that the extensions may be readily broken or removed from the lugs 12. In the event a solid type cover or wall plate is to be used instead of the hollow plate 19 such extensions must be removed as there will be no space under the plate to receive them. Or if the opening in the plaster is too large these extensions will not project sufficiently to rest on the wall surface and the device must then be located by the wall box. When the extensions 18 are removed from the lugs they form washers, and if needed may be inserted between the lugs 12 and the ears 10 to boost the switch outwardly to bring it flush with the surface of the wall 5, or to level it up to locate it parallel with this surface and in proper relation thereto should the wall box be tilted or otherwise improperly located.

Figure 4:
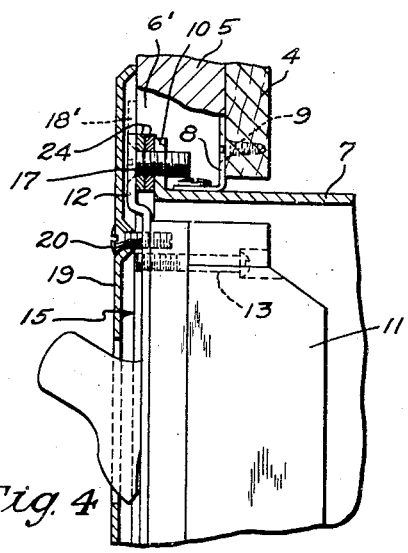
Fig. 4 is a view somewhat similar to Fig. 2 but showing the mounting of the switch with the use of the booster washers as above mentioned.

This use of the extensions as washers may be required when the solid type wall plate is used or when as in Fig. 4 the wall 5 adjacent the opening 6' is broken back to such an extent that the extensions 18 if on the lugs 12 would not overlie the surface of the wall. In Fig. 4 the dotted lines 18' suggest the positions the extensions would occupy had they not been removed from the lugs 12. It will be noted that such extensions would not overlie the surface of the wall 5. Therefore the extensions if left on the lugs would accomplish no good purpose. However, in the figure the extensions have been broken or removed from the lugs and the extensions now form washers 24 located about the screws 17 and disposed between the lugs 12 and the ears 10 on the wall box.

From this it will appear that in Fig. 4 the severed extensions form washers serving to booster out the switch or other electrical device 11 so as to bring it flush with the surface of the wall 5, or to level it up and properly locate it should the wall box be tilted or otherwise improperly located. The present means or yoke 15 for the mounting of electrical devices in wall boxes therefore includes all elements necessary for the mounting of an electrical device under any of the varying conditions above mentioned. It may be used with the extensions 18 integral with the lugs as in Figs. 1 and 2 or if the extensions cannot be so used they may be readily severed from the lugs, and then if washers are needed they are obtained merely by the severing operation described.

Washers are generally supplied in the packing boxes with switches and other electrical wiring devices but such washers are loose in the boxes and become misplaced and lost and are not always on hand when needed. With the present invention the washers are integral with the yoke 15 until needed and will not become lost and are at hand when needed.

Having thus set forth the nature of my invention, what I claim is:

Means for use in mounting an electrical device in a wall outlet box, including an attachment lug provided with an opening to receive a fastening screw for use in attaching the lug to a wall outlet box, and a pair of spaced readily removable wall-engaging extensions carried by and integral with the lug and located beyond said opening and comprising ear-like members each having an opening adapted to receive said screw whereby to provide booster washers for use on the screw when said extensions are removed from the lug.

HARVEY HUBBELL, Jr.